United States Patent Office 3,538,196
Patented Nov. 3, 1970

3,538,196
BIS(OXYPROPYLATED PENTAERYTHRITOL) OXYPROPYLATED PENTAERYTHRITOL PHOSPHONATE
Charles F. Baranauckas and Irving Gordon, Niagara Falls, N.Y., assignors to Hooker Chemical Corporation, Niagara Falls, N.Y., a corporation of New York
No Drawing. Filed Dec. 11, 1963, Ser. No. 329,858
Int. Cl. C07f 9/38; C07d 105/04; C08a 22/44
U.S. Cl. 260—953                    1 Claim

ABSTRACT OF THE DISCLOSURE

A member of the group consisting of (1) a phosphonate having the formula

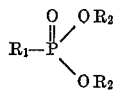

wherein $R_1$ is selected from the group consisting of hydroxy lower alkyl, hydroxy lower alkoxy lower alkyl and hydroxy poly lower alkoxy lower alkyl and $R_2$ is selected from the group consisting of hydroxy lower alkyl, hydroxy lower alkoxy lower alkyl and hydroxy poly lower alkoxy lower alkyl and (2) polymers of said phosphonate. The compounds are prepared by reacting one mole of a triorgano phosphite with three moles of a polyol and then reacting the product with an Arbuzov catalyst. The phosphonates are used to prepare foamed polyurethanes.

This application relates to novel esters of phosphonic acid and the preparation thereof. More particularly, it relates to esters of phosphonic acid containing three or more hydroxy groups, methods for the preparation thereof, products containing said esters and uses thereof.

In accordance with the present invention, esters of phosphonic acid have been prepared having the structural formula:

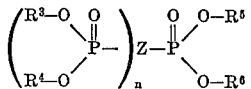

wherein Z is selected from the group consisting of alkyl, alkylene, alkenyl, aryl substituted alkyl, aryl, alkyl substituted aryl, nitroalkyl, halogen substituted aryl, heterocyclic, hydroxy substituted alkyl, hydroxy substituted alkylene, halogen substituted alkylene, substituted alkenyl, halogen substituted alkyl, hydroxy substituted aryl, hydroxy aryl substituted alkyl, hydroxy alkyl substituted aryl, hydroxy alkyl substituted heterocyclic, hydroxy alkoxy alkyl, hydroxy polyolkoxy alkyl and mixtures thereof, $R^3$, $R^4$, $R^5$ and $R^6$ are selected from the group consisting of alkyl, aryl, alkyl substituted aryl, aryl substituted alkyl, nitro alkyl, halogen substituted aryl, halogen substituted alkyl, hydroxy alkyl, alkoxyalkyl, hydroxy alkoxy alkyl, alkenyl, substituted alkenyl, hydroxy polyalkoxy alkyl, and mixtures thereof, $n$ is from 0 to 5 and the molecule contains from 3 to about 32 hydroxyls.

Further, the novel phosphonates may be defined as members of the group consisting of (1) a phosphonate having the formula

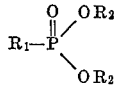

where $R_1$ is selected from the group consisting of hydroxy lower alkyl, hydroxy lower alkoxy, lower alkyl and hydroxy poly lower alkoxy lower alkyl, and $R_2$ is selected from the group consisting of hydroxy lower alkyl, hydroxy lower alkoxy lower alkyl, and hydroxy poly lower alkoxy lower alkyl and (2) polymers of said phosphonates.

The novel esters of phosphonic acid containing from 3 to about 32 free hydroxyl groups are particularly useful phosphorus-containing chemicals and undergo many reactions with other poly-functional intermediates. They react with polyisocyanates, e.g., toluene diisocyanate or polymethylene polyphenyl isocyanate to form foamed-polyurethanes which are flame resistant and have improved heat distortion temperatures. In addition, the free hydroxyl groups in the phosphonates of this invention may be reacted with polybasic acids and anhydrides, e.g., isophthalic acid, fumaric acid, maleic anhydride, and the like, to form resinous polyester compositions that are flame resistant. The novel esters of phosphonic acids containing from 3 to 32 hydroxyl groups are significantly resistant to hydrolytic attack. The are useful for reactions in alkyd resins that are used to make film-forming products. The products formed have improved resistance to burning. The novel esters of phosphonic acid containing from 3 to 32 hydroxyl groups are particularly useful in polyolefins, e.g., polypropylene and polyethylene, to improve the dyeing characteristics of fabrics produced. In part, this utility is improved because they are not subject to loss by evaporation, hydrolysis or leaching.

Phosphonates (esters of phosphonic acid) may be prepared in a variety of ways. The phosphonates of this invention may be prepared by the reaction of a triorgano phosphite, e.g., triphenyl phosphite, trimethyl phosphite, diphenyl methyl phosphite, diphenyl butyl phosphite, phenyl dibutyl phosphite, and so forth with three moles of a polyhydric compound having the formula $R^7(OH)_m$, wherein $R^7$, X and $m$ are as defined herein. Further if phatic and aromatic hydrocarbons, and $m$ is from 3 to 33, in the presence of a catalyst, and then rearranging the thus formed ester of phosphorous acid by heat, or Arbuzov catalyst to an ester of phosphonic acid.

The product of this reaction would have the structure:

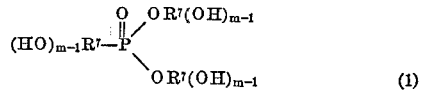            (1)

They may also be prepared by the reaction of 1 mole of a triaryl phosphite with 1 mole of an aliphatic alcohol and 2 moles of a polyhydric compound having the structure set forth above.

This reaction product has the structure

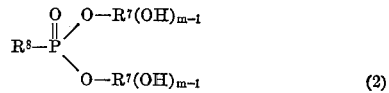            (2)

wherein $R^8$ is an alkyl having from 3 to 20 carbon atoms and $R^7$ and $m$ are as defined above. Further, the phosphonates of the invention may be formed by the reaction of one mole of triorgano phosphite with 2 moles of a polyhydric compound as disclosed herein to form a cyclic phosphite, and rearranging said phosphite by utilizing a stoichiometric proportion of an Arbuzov reagent to form the phosphonate.

The phosphonate product will have the structure

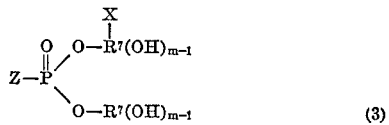            (3)

wherein $R^7$, X and $m$ are as defined herein. Further if from 2, 3, or 5 moles of the cyclic phosphite is reacted with one mole of an Arbuzov reagent a non-cyclic phosphonate having 2,3,4 or 5 phosphorus moieties will be formed. Preferably $R^7$ is selected from the group consisting of alkyl, alkyl substituted aryl, aryl substituted alkyl, nitro alkyl, halogen substituted aryl, alkyl substituted alkenyl, and mixtures thereof. By utilizing an Arbuzov reagent either in catalytic or stoichiometric amounts or by applying heat, the phosphites formed by the processes of this invention can be converted to the phosphonates. It is surprising that the intermediate esters of the phosphorous acid formed by this invention will rearrange under heat or by employing catalytic amounts of an Arbuzov reagent and that by utilizing the stoichiometric amount of an Arbuzov reagent one is able to produce compounds of a wide range of groups linked directly to phosphorus.

Although it is preferred to utilize a triaryl phospite, e.g., triphenyl phosphite, tricresyl phosphite, and so forth, triorgano phosphites containing from one to about 32 carbons in each hydrocarbon attached through oxygen to phosphorus may be utilized in the practice of this invention. Hydrocarbon groups containing from 1 to about 20 carbon atoms may also be utilized in the practice of this invention, with the more preferred embodiments of this invention deriving from phosphites containing from 1 to about 12 carbon atoms in each hydrocarbon group attached through oxygen to phosphorus.

Triorganic phosphites which may be utilized are triaryl phosphites, trialkyl phosphite, diaryl monoalkyl phosphites, monaryl dialkyl phosphites. Examples of these phosphites are triphenyl phosphite, triethyl phosphite, trimethyl phosphite, dicresyl butyl phosphite, di(2,4-xylenyl) butyl phosphite, dicresyl hexyl phosphite, dicresyl octadecyl phosphite, diphenyl butyl phosphite, diphenyl stearyl phosphite, dibutyl - 2,4 - xylenyl phosphite, dibutyl phenyl phosphite, distearyl phenyl phosphite, distearyl cresyl phosphite, tris(2-methyl phenyl) phosphite, tris(3-methylphenyl) phosphite, tris(4-methylphenyl) phosphite, tris(2-chlorophenyl) phosphite, tris-(3 - chlorophenyl) phosphite, tris(2,3 - dichlorophenyl) phosphite, tris(3-bromophenyl) phosphite, tris(4 - iodophenyl) phosphite, tris(2-chloro-4-bromophenyl) phosphite, tris(3,5 - dimethylphenyl) phosphite, tris(2 - ethylphenyl) phosphite, tris(2-cyclohexyphenyl) phosphite, tris(4-octylphenyl) phosphite, tris(2-secondary butylphenyl) phosphite, tris(2-nitrophenyl) phosphite, tris(2-methoxylphenyl) phosphite, tris(alpha-naphthyl) phosphite, tris(beta-naphthyl) phosphite, and tris-1-(2,4-dibromo) naphthyl phosphite.

The polyhydric compounds which may be used in the practice of this invention are those which are of $R^7(OH)_m$ wherein $R_7$ and $m$ are as described above contain from 1 to about 32 carbon atoms. Better results are obtained, however, when from 1 to about 18 carbon atoms are present and the best products are obtained with from 1 to about 12 carbon atoms.

Examples of polyhydric compounds are 2,5-bishydroxymethyl-hexanediol-(1,6)
2,5-dinitro-2,5-bishydroxymethyl-hexanediol-(1,6)
2,6-dinitro-2,6-bishydroxymethyl-heptanediol-(1,7)
2,7-dinitro-2,7-bishydroxymethyl-octanediol-(1,8)
2-methylol-2-nitro-propanediol-(1,3)
4-methyl-2-methylol-pentanediol-(1,3)
2-nitro-4-methyl-2-methylol-pentanediol-(1,3)
2-nitro-2-hydroxymethyl-butanediol-(1,4)
2-nitro-2-hydroxymethyl-pentanediol-(1,3)
2-nitro-2-hydroxymethyl-hexanediol-(1,3)
trimethylol isobutane
2-nitro-5-methyl-2-hydroxymethyl-hexanediol-(1,3)
annhydroennea-heptitol
1,1,1,3,3,3-hexamethylol-propanol-2
2,2,6,6-tetramethylol cyclohexanol-1
2,2,5,5-tetramethylol-cyclopentanol-1
beta,beta'-dihydroxy-t-butyl benzyl alcohol
2-hydroxymethyl-butanetriol-1,2
pentaerythritol monomethylether
pentaerythritol
dipentaerythritol
tripentaerythritol
trimethylol propane and other trimethylolalkanes, e.g., trimethylol ethane, trimethylol butane, trimethylol octadecane and trimethyl decane. Although polyols containing from 3 to about 33 hydroxyls may be employed in the practice of this invention, polyols having from 3 to 12 hydroxyls are preferred, with polyols containing from 3 to 8 hydroxyls being most favored.

The Arbuzov reagents utilized in the practice of this invention have the formula $ZX_a$ wherein Z is as defined above, $a$ is from 1 to 5 and X is a halogen selected from the group consisting of iodine, bromine and chlorine.

Arbuzov reagents which may be utilized in the practice of this invention are alkyl halides, alkenyl halides, alkyl substituted alkenyls, cycloalkyl halides, aralkyl halides, containing between about 1 and 70 carbon atoms with the preferred reagents having between 1–22 carbon atoms, with the most preferred having between about 1–18 carbon atoms. Examples of these reagents are, methyl iodide, butyl chloride, butyl iodide, pentyl fluoride, pentyl bromide, hexyl chloride, nonyl chloride, nonyl bromide, octyl iodide, octyl bromide, decyl bromide, isodecyl bromide, undecyl chloride, undecyl iodide, undecyl fluoride, hexadecyl bromide, hexadecyl chloride, stearyl chloride, 1,2-dibromoethane, 1,3-dichloropropane, 1,2-dibromo ethyl ether, 1,4-dichloro-2-ethoxybutane, allyl chloride, methallyl chloride, chloropropylene, chlorobutylene, bromopropylene, isodopropylene, fluorododecylene, dichlorobutylene, dichloropropylene, chlorobromoiodobutene, chloromethylacetylene, bromomethylacetylene, dichlorododecylene, dibromo octadecylene, bromobutene, chlorobromopentene, dichlorobutane, dibromobutane, dibromodecane, difluoroeicosane, methylene iodide, 1,4-chloromethyl benzene, carbon tetrachloride, dichlorodibromomethane, acetylene tetrabromide, trichloroethylene, fluorochlorobromomethane, methyl chloroform, hexachloroethane, heptachloropropane, perbromothylene, chlorocyclopropane, dibromocyclopropane, dichlorocyclopropane, bromocyclobutane, bromocyclopentene, 2-chloroethyl, bromocyclooctane, chlorocycloheptane, 2-chlorocyclopentene, 2-iodol-1, 3-cyclohexadiene, 7,7 - dichloronorcarene, 7,7 - dibromonorcarene, 1 - chloro - 1,3 - dimethylcyclohexane, bromocyclopentane, bromodecalin, chlorodecalin, bromocyclotetradecane, chlorocyclopentadecane, 1,2-dibromocyclohexane, 1-iodo-1-methylcyclopentane, isomers of the above, and so forth. It is preferred to utilize cycloalkyls containing between about 3 and 70 carbon atoms, with cycloalkyls containing about 3 to 13 carbon atoms being preferred and the most preferred cycloalkyls containing between about 3 and 7 carbon atoms. Examples of aralkyl halides that may be utilized as an Arbuzov reagent in the practice of this invention are diphenylbromomethane, triphenylbromomethane, benzyl chloride, benzal chloride, benzotrichloride, chloromethylnaphthalene, 1 - phenyl - 1 - chloroethane, bromomethylnaphthalene, chloromethylanthracene, bromomethylanthracene, 1-phenyl-2-chloroethane, benzyl bromide, 1-phenyl-2-bromoethane, 1-phenyl-2-chloropropane, bischloromethylnaphthalene, chloromethylpolystyrene, bromomethyltoluene, bromomethylxylene, dichlorobromomethylbenzene, chloromethylanisole, bisbromomethylanisole, bromomethylfluorine, and so forth. It is preferred to utilize an aralkyl containing between about 6 and 70 carbon atoms. It is more preferred to utilize an aralkyl hydrocarbon having between about 6 and 12 carbon atoms, with the most preferred aralkyl hydrocarbons containing between 6 and 10 carbon atoms. The ease of reaction varies with the nature of the halogen atom in the reagent. The decreasing order of activity is iodide, bromide and chloride.

The above Arbuzov reagents are merely illustrative and not to be considered as limiting the invention disclosed herein. It will be clear to those skilled in the art that the Arbuzov reaction or catalytic isomerization may also be effected by compounds selected from the group consisting of acyl halides, heteroalkyl halides, alpha-haloketones, alpha-haloamides, alpha-halonitrite, chlorocarbamates, beta-haloesters, epichlorohydrin, epibromohydrin, iodobenzene, and so forth.

Examples of other catalysts which may be utilized to cause an Arbuzov rearrangement are alkali metal halides, such as sodium iodide, potassium fluoride, sodium bromide, lithium iodide, cesium iodide, and so forth. Isomerization (Arbuzov rearrangement) may also be induced by various other reagents such as methyl sulfate, cuprous chloride, cuprous iodide, iodine or even by thermal means alone.

The products formed by following the teachings of this invention may be polymers wherein the polymer contains between 2 and 20 phosphorus atoms. Typical specific individual radicals that are illustrative but not limiting for Z, $R_1$, $R_2$, $R_3$, $R_4$, $R_5$, $R_6$ and $R_7$ are as follows:

Alkyl and cycloalkyl

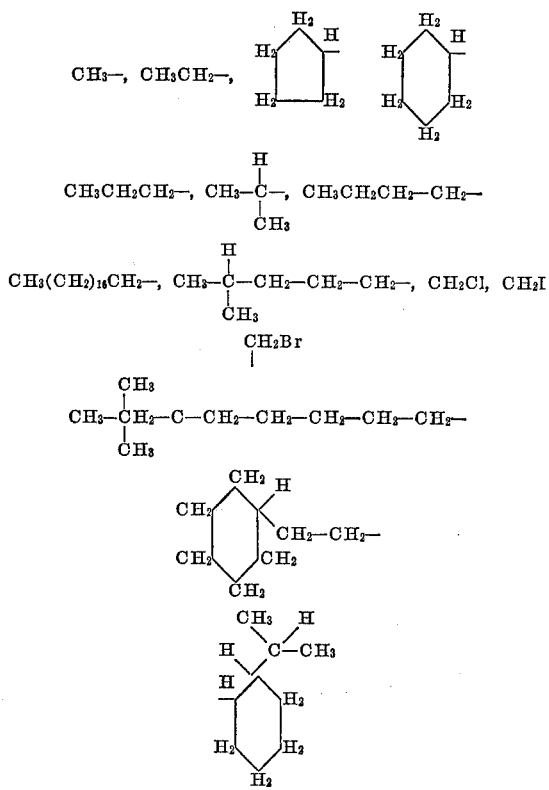

Aryl

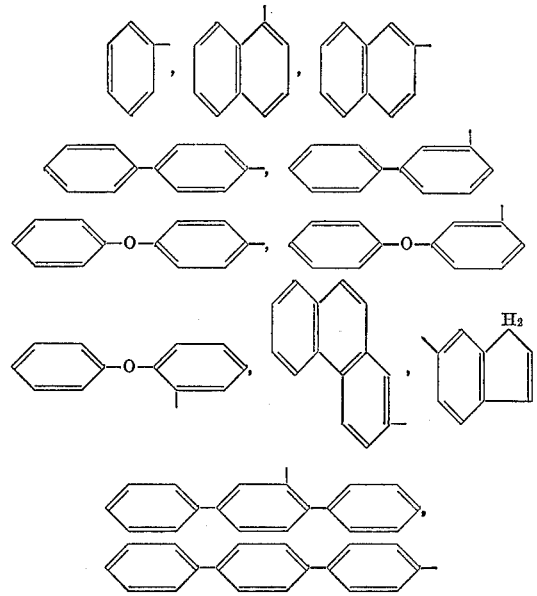

Halo substituted aryl

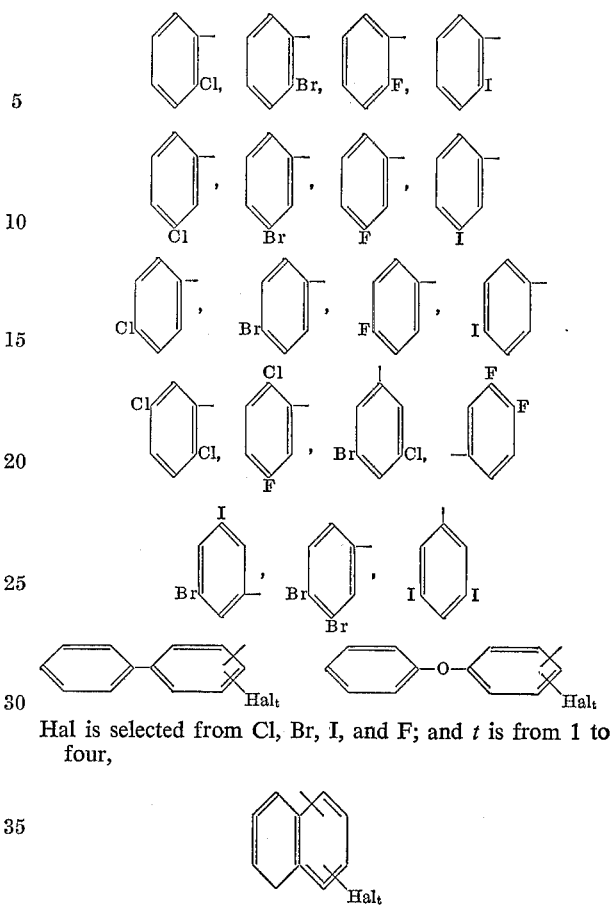

Hal is selected from Cl, Br, I, and F; and $t$ is from 1 to four,

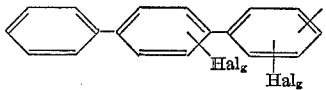

Hal is selected from Cl, Br, I and F; and $t$ is from 1 to four,

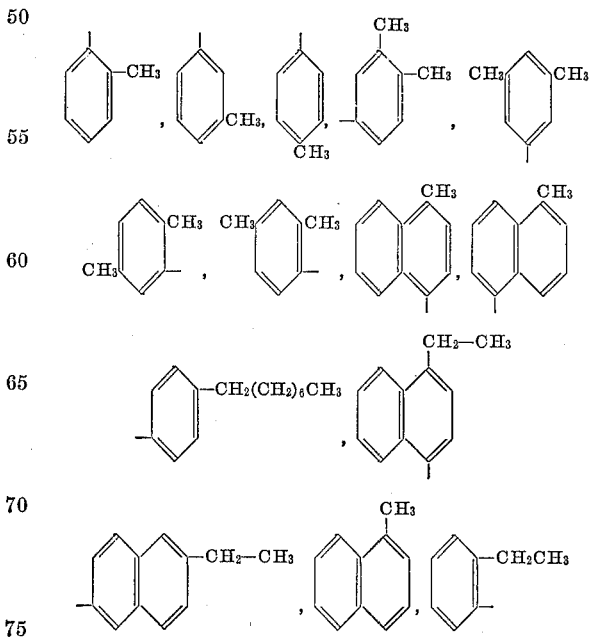

Hal is selected from Cl, Br, I, and F; and the sum of $g$ is from 1 to seven,

Alkyl-substituted aryl

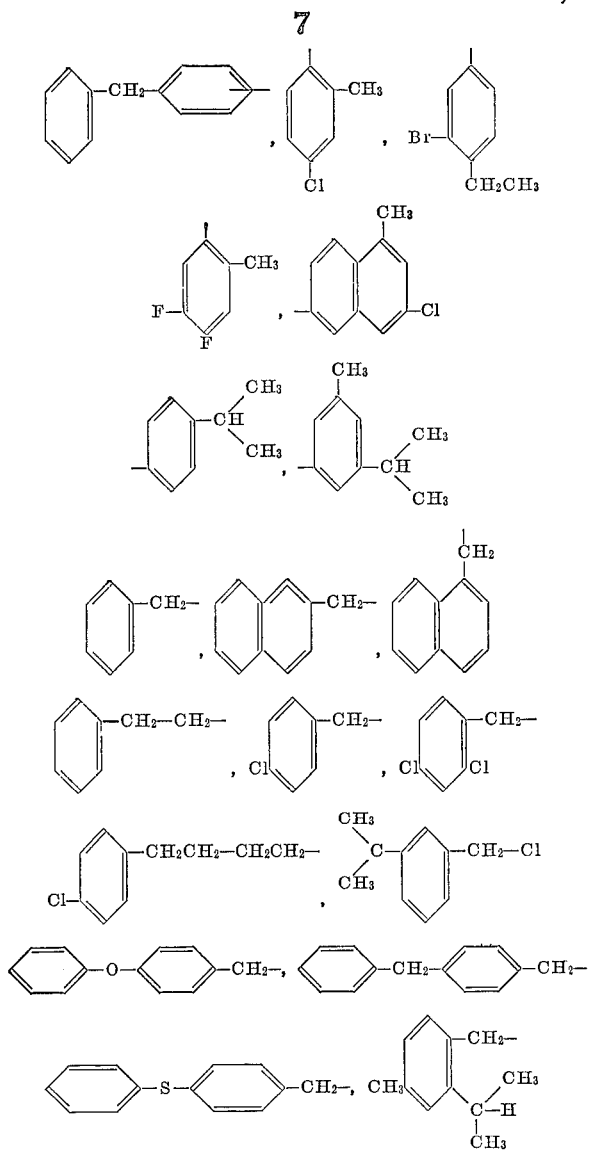
Hydroxy alkyl and hydroxy cycloalkyl
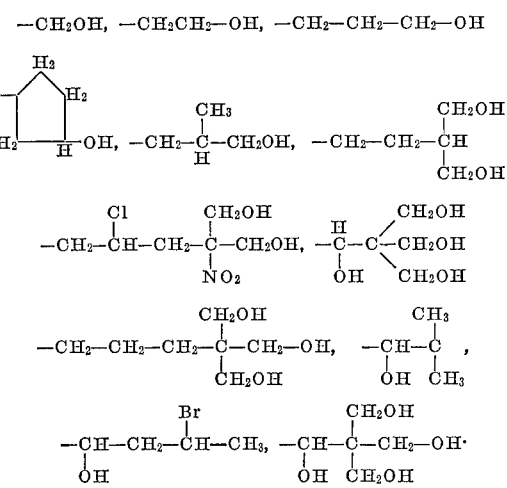
Hydroxy alkoxy alkyl
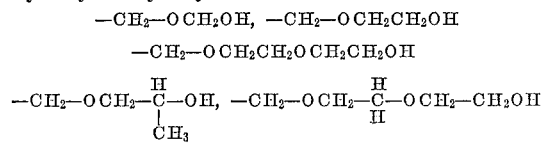
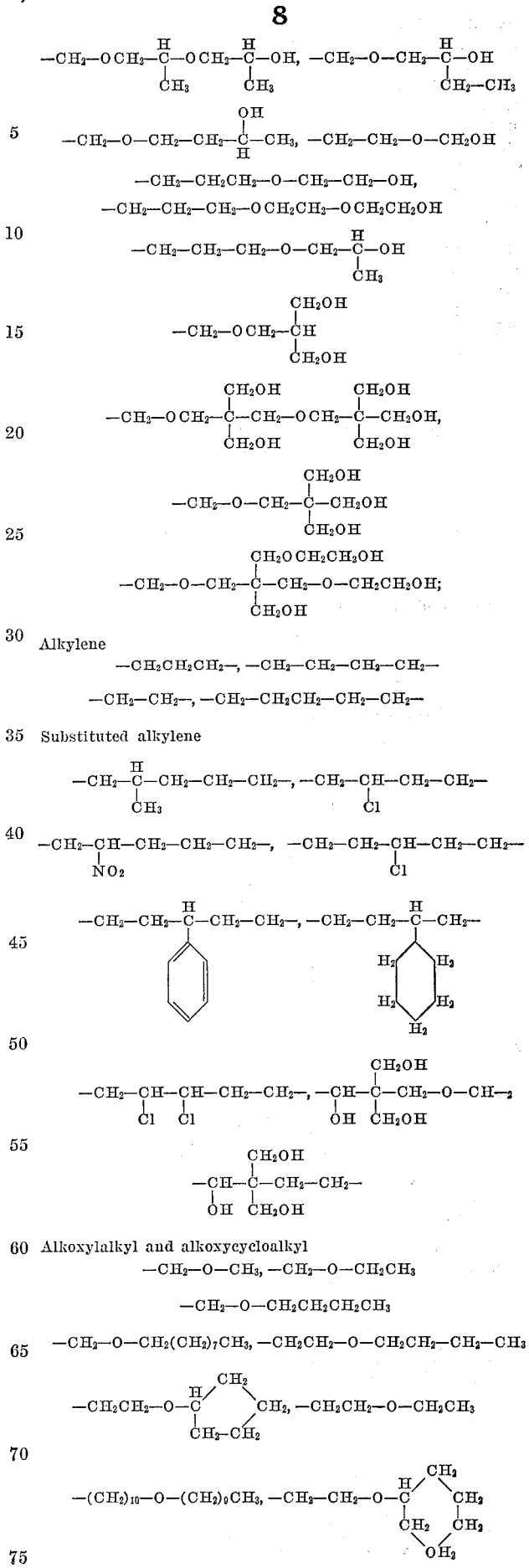
Alkylene
Substituted alkylene
Alkoxylalkyl and alkoxycycloalkyl Alkenyl and cycloalkenyl
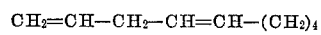
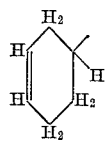 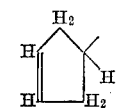 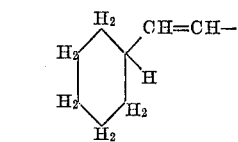
To further understand the invention the following reactions are illustrative thereof, but are not to be deemed to be limiting in any manner:
(1)
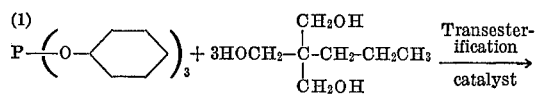
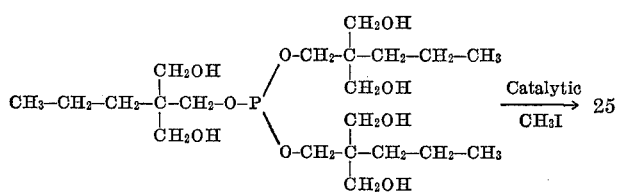
(2)
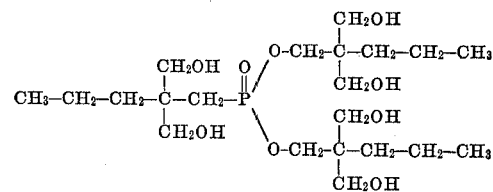
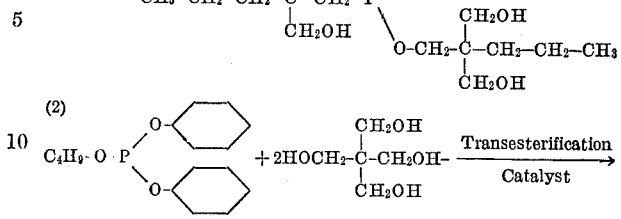
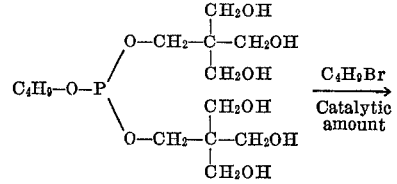
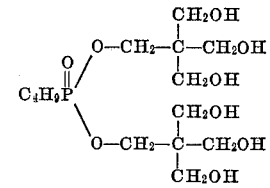
(3)
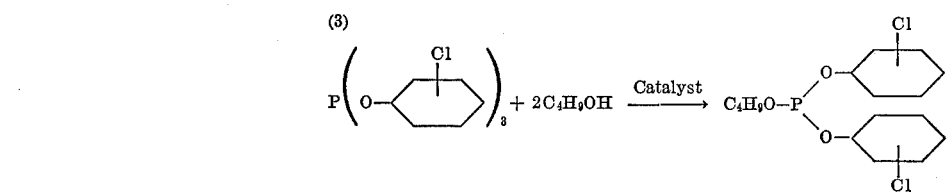
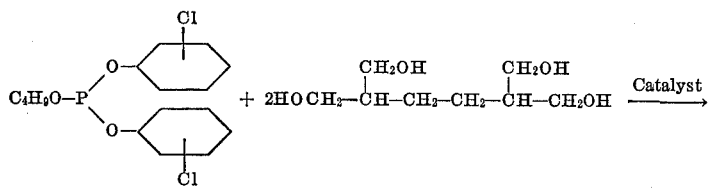
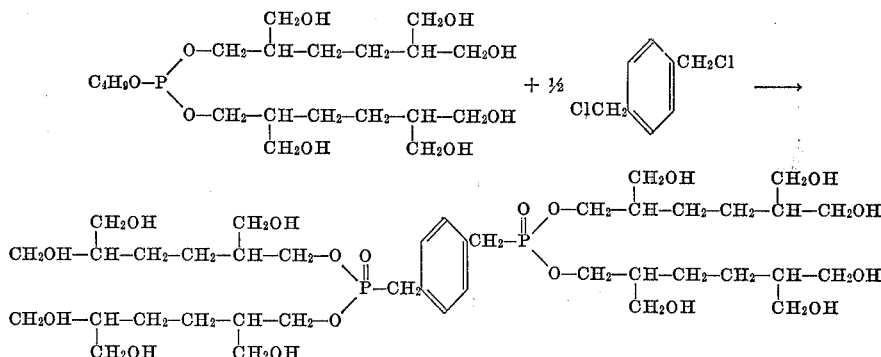
(4)
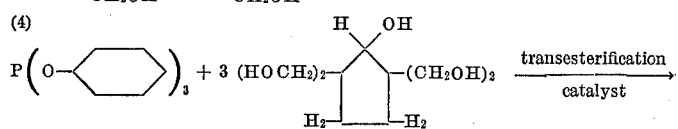
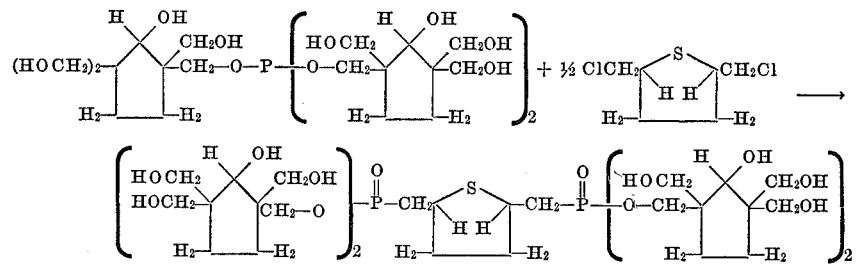

3,538,196
(5) 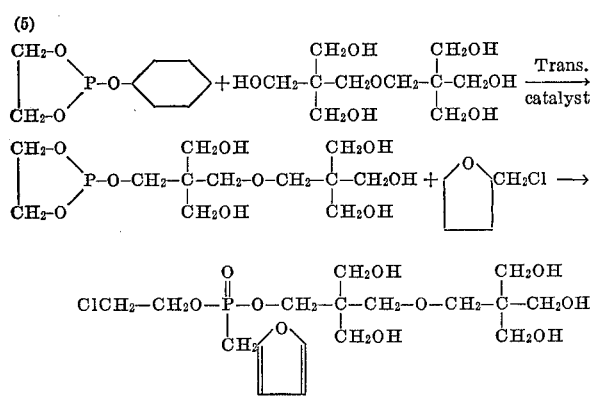
(10) 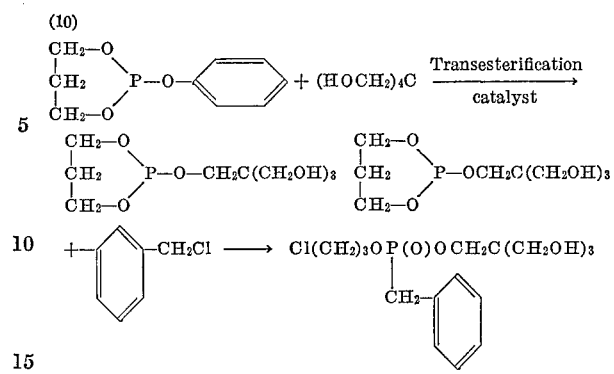
(6) 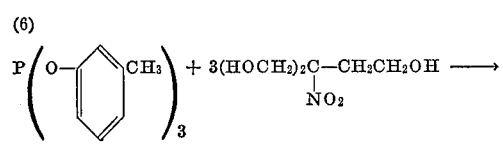
(11) 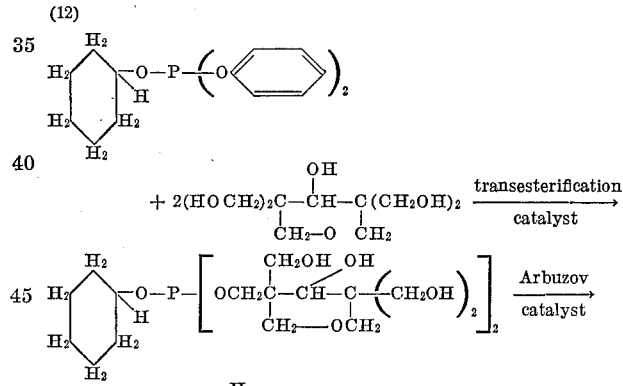
(7) 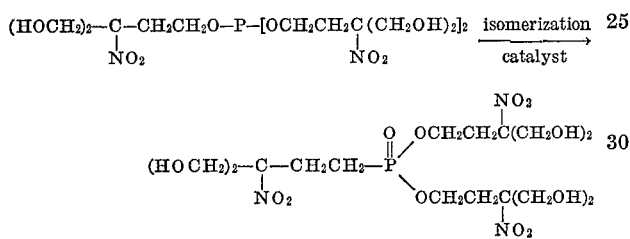
(12) 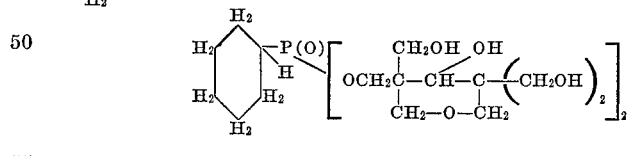
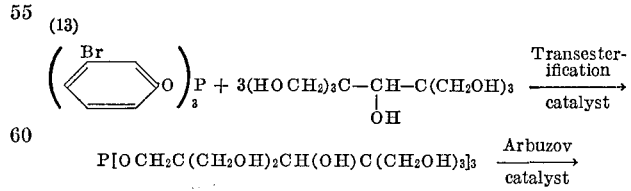
(8) 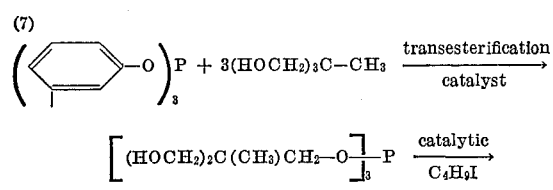
(13) 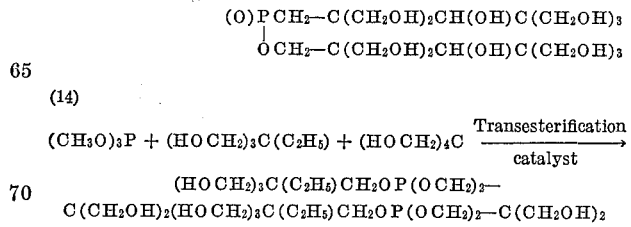
(9) 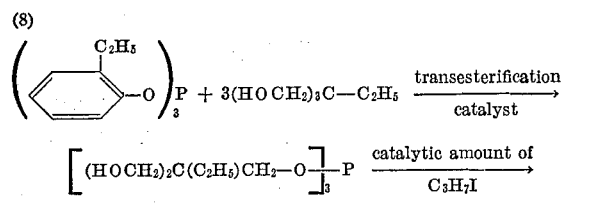
(14) 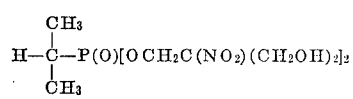
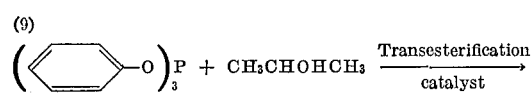
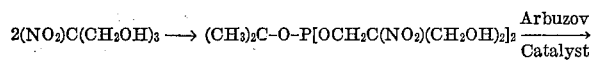

(15)

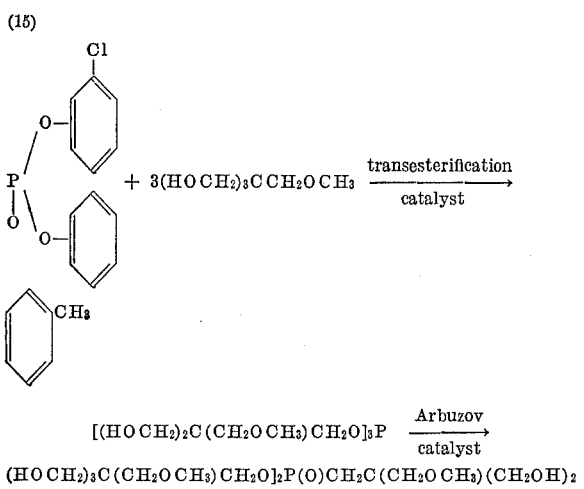

$[(HOCH_2)_2C(CH_2OCH_3)CH_2O]_3P \xrightarrow{\text{Arbuzov catalyst}}$ $(HOCH_2)_3C(CH_2OCH_3)CH_2O]_2P(O)CH_2C(CH_2OCH_3)(CH_2OH)_2$ The reactions given illustrate various features of the invention, there being many more variations. It is to be understood that some isomers, polymers, and isomeric polymers of the structures illustrated and claimed herein containing from 1 to 20 phosphorus atoms are within the scope of the invention. The reactions of this invention may be carried out at temperatures of 25 degrees to 300 degrees centigrade. The preferred temperature range is between 75 degrees and 200 degrees centigrade, with a more preferred range being between 160 and 200 degrees centigrade. The preparation of the phosphites, as well as the Arbuzov rearrangement may be carried out at temperatures within the range set forth above. However, it is to be understood that the temperature employed may be varied when subatmospheric and superatmospheric pressures are utilized. The preparation of the phosphites may be carried without utilizing a catalyst. However, utilizing a transesterification catalyst, accelerates the rate of reaction. Examples are a metal alcoholate, phenolate or hydride, such as sodium methylate, lithium methylate, potassium methylate, sodium ethylate, sodium isopropylate, sodium phenolate, potassium phenolate, sodium cresylate, sodium hydride, sodium metal, lithium metal, sodium hydroxide, diesters of phosphorous acid, and so forth. It is preferred that the basic transesterification catalyst utilized have a pH of at least 7.5 in a 0.1 normal solution to be utilized in the reaction.

The Arbuzov rearrangement is deemed completed on obtaining a negative result in the iodine test for phosphite.

In the preparation of the polyurethane compositions containing the novel esters of phosphonic acid disclosed in this invention, it is preferred to use a hydroxyl-containing polymeric material having an hydroxyl number from about 25 to about 900. Such a polymeric material can be a polyester, a polyether or mixtures thereof. Particularly suitable are mixtures of a polyester and a polyether wherein the polyester portion comprises at least 25 percent of the mixture. Excellent results are obtainable when less than 25 percent polyester is employed, but supplementary additives may be required to render such a foam self-extinguishing. It is especially preferred in the present invention to use a mixture of polyester and polyether in the ratio of 25 to 75 parts polyester to 75 to 25 parts of polyether. Generally, the hydroxyl-containing polymers have a molecular weight in the range from 200 to about 4,000.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. The carboxylic compounds can be aliphatic, cyclo aliphatic, aromatic, or heterocyclic and either saturated or unsaturated. Among the polycarboxylic compounds which can be used to form the polyester are: maleic acid; fumaric acid; phthalic acid; isophthalic acid; terephthalic acid; tetrachlorphthalic acid; aliphatic acids such as oxalic, malonic, succinic, glutaric and adipic; 1,4-cyclohexadiene-1,2-dicarboxylic acid and the like. Additional polycarboxylic compounds which can be used to form the polyester are Diels-Alder adducts of hexahalocyclopentadiene and a polycarboxylic compound, wherein the halogen is selected from the group consisting of chlorine, bromine, fluorine and mixtures thereof, for example: 1,4,5,6,7,7-hexachlorobicyclo-(2,2,1) - 5 - heptene - 2,3-dicarboxylic acid; 1,4,5,6-tetrachloro-7,7-difluorobicyclo-(2.2.1)-5-heptene-2,3-dicarboxylic acid; 1,4,5,6,7,7-hexabromobicyclo-(2.2.1)-4-heptene-2,3-dicarboxylic acid; 1,4,5,6 - tetrabromo-7,7-difluorobicyclo-(2.2.1)-5-heptene - 2,3, - dicarboxylic acid; and the like. Mixtures of any of the above polycarboxylic compounds can be employed. In order to obtain a satisfactory rigid foam, at least a portion of the total polyhydric alcohol component should consist of a polyhydric alcohol containing at least three hydroxyl groups. This is desired to provide a means for branching the polyester. Where an even more rigid structure is desired, the whole alcohol component may be made up of a trifunctional alcohol such as glycerol. Where a less rigid final product is desired, a difunctional polyhydric alcohol such as ethylene glycol or 1,4-butanediol may be utilized as that part of the polyhydric alcohol component. Other glycols such as diethylene glycol, triethylene glycol, propylene glycol, dipropylene glycol, other polypropylene glycols, butylene glycols, polybutylene glycols, and the like can also be used. Among the polyhydric alcohols which can be used are glycerol, hexanetriol, butanetriol, trimethylol propane, trimethylol ethane, pentaerythritol, manitol, sorbitol, cyclohexanediol - -1,4-glycerol monoethyl ether and the like. The ratio of the polyhydric alcohol such as glycerol to the polybasic acid can be expressed as the hydroxyl-carboxyl ratio, which can be defined as the number of moles of hydroxyl groups to the number of moles of carboxyl groups in a given weight of resin. This ratio may be varied over a wide range. Generally, however, a hydroxyl-carboxyl ratio of between 1.5:1 and 5:1 is needed.

Instead of employing a polycarboxylic compound which is Diels-Alder adduct of hexahalocyclopentadiene and a polycarboxylic compound, a polyhydric alcohol which is a Diels-Alder adduct of hexahalocyclopentadiene and a polyhydric alcohol can be used. This is done by employing (A) a polyester resin compound of the reaction product of (1) an adduct of hexahalocyclopentadiene and a polyhydric alcohol containing aliphatic carbon-to-carbon unsaturation, (2) a polycarboxylic compound and (3) a polyhydric alcohol containing at least three hydroxyl groups. Typical adducts include: 2,3-dimethylol-1,4,5,6,7,7-hexachlorobicyclo-(2.2.1)-5-heptene; and 2,3-dimethylol-1,4,5,6-tetrachloro-7,7-difluorobicyclo - (2.2.1)-5-heptene. Similar compounds are disclosed in U.S. Pat. 3,-007,958.

Where aromatic or bicyclo carboxylic compounds are used, aliphatic acids are sometimes incorporated into the polyester resin. Adipic acid is generally preferred for this purpose, although other suitable acids may be used such as oxalic, malonic, succinic, glutaric, pimelic, suberic, azelaic, etc. Unsaturated acids such as maleic, fumaric, itaconic, citraconic, aconitic, etc., can also be used.

The preferred polyesters are those which contain an adduct of hexahalocyclopentadiene co-reacted in the polyester portion in view of the fact that they contain a large amount of stable chlorine, thereby enhancing the flameretardant characteristics of the resultant foam. Particularly preferred are those polyesters wherein the adduct is reacted in the polycarboxylic portion of the polyester, due to lower cost and commercial availability of the polycarboxylic adducts of hexahalocyclopentadiene.

The polyethers employed are known in the art, and are the reaction products of (1) either a polyhydric alcohol, a polycarboxylic acid or a polyphenolic compound, and (2) a monomeric 1,2-epoxide possessing a single 1,2-epoxy group, such as, for example, propylene oxide. The polyhydric alcohols and polycarboxylic acids which may be employed are any of the polyhydric alcohols and polycarboxylic acids hereinbefore listed. Polyphenolic compounds which can be employed are the reaction products of phenolic compounds with aldehydes, such as phenol-formaldehyde resins. Examples of monomeric 1,2-epoxides include ethylene oxide, propylene oxide, butylene oxide, isobutylene oxide, 2,3-epoxyhexane, 3-ethyl-2,3-epoxyoctane, epichlohydrin, epibromohydrin, styrene oxide, glycidyl ether, methyl glycidyl ether, phenyl glycidyl ether, butyl glycidyl sulfide, glycidyl methyl, sulfone, glycidyl methacrylate, glycidyl acrylate, glycidyl benzoate, glycidyl acetate, glycidyl actanoate, glycidyl sorbate, glycidyl allyl phthalate, and the like. The preferred monoepoxides are the monoepoxide substituted hydrocarbons, the mono-expoxy-substituted ethers, sulfides, sulfones and esters wherein the said compounds contain no more than eighteen carbon atoms. A lower alkylene oxide is preferably employed in rigid foams as the higher counterparts yield flexible rather than rigid products.

A large number of different organic polyisocyanates can be used. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and mixtures thereof. However, others may be used, among them phenyl diisocyanate; alpha-naphthyl diisocyanate; 4-tolylene diisocyanate; n-hexyl diisocyanate; methylene-bis-(4-phenyl isocyanate); 3,3'-bitolylene-4,4'-diisocyanate; 3,3'-dimethoxy-4,4'-biphenylene diisocyanate; 1,5-naphthalene diisocyanate; 2,4-chlorophenyl diisocyanate; hexamethylene diisocyanate; ethylene diisocyanate; trimethylene diisocyanate; 1,3-cyclopentylene diisocyanate; 1,2-cyclohexylene diisocyanate; 1,4-cyclohexylene diisocyanate; cyclopentylidene diisocyanate; cyclohexylidene diisocyanate; p-phenylene diisocyanate; m-phenylene diisocyanate; 4,4'-diphenyl propane diisocyanate; 4,4'-diphenyl methane diisocyanate; 1-methyl-2,4-phenylene diisocyanate; 4,4'-diphenylene diisocyanate; 1,2-propylene diisocyanate; 1,2-butylene diisocyanate; ethylidene diisocyanate; propylidene diisocyanate; butylidene diisocyanate;1,3,5-benzene triisocyanate; 2,4,6-tolylene triisocyanate; 2,4,6-monochlorobenzene triisocyanate; 4,4', 4''-triphenylmethane triisocyanate; polymethylene polyphenylisocyanate and mixtures thereof. Higher isocyanates are provided by the liquid reaction products of (1) diisocyanates and (2) polyols or polyamines; etc. In addition isothiocyanates and mixtures of isocyanates may be employed. Also contemplated are the many impure or crude polyisocyanates that are commercially available, such as crude mixtures of methylene bis(4-phenylisocyanate).

The catalyst employed can be any of the known conventional catalysts for isocyanate reactions, such as tertiary amines, for example, triethylamine, N-methyl morpholine, triethanolamine, etc., or antimony compounds such an antimony caprylate, antimony naphthenate, or antimonous chloride. In addition, tin compounds can be employed such as dibutyltin dilaurate, tri-n-octyltin oxide, hexabutylditin, tributyltin phosphate, or stannic chloride. Phosphorus acids, such as the alkyl acid phosphates, can also be employed. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semirigid polyurethane foam is usually obtained.

Any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, trichlorofluoromethane, trichlorotrifluoromethane, dichloromonochloroethane, monochloromonofluoroethane, dichloromonochloroethane, and difluorodichloroethane.

Another foaming system that is suitable for carrying out the foaming reaction at an elevated temperature is found in U.S. Pat. 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1, 2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetra(hydroxymethyl) phosphonium chloride. In addition, mixtures of the above foaming agents can be employed.

In preparing the polyurethane compositions of this invention, the hydroxyl containing polymer, either alkyd resin or polyether, and polyisocyanate are preferably reacted in a ratio sufficient to provide about eighty-five to one hundred and fifteen percent of isocyanato groups with respect to the total number of hydroxyl and carboxyl groups present in the hydroxyl-containing polymeric material (and the foaming agent, if one is provided). The reaction temperature generally ranges from about twenty to about one hundred and twenty degrees centigrade, although higher and lower temperatures can be used.

The phosphonates of the present invention may be utilized in the range of from about 0.2 to 100 percent of the polyol component contained in the Urethane Foam System; however, the preferred range being from about 5 to about 40 percent, with best results for flame-retarding being obtained when from 10 to 30 percent of the polyol component contained in the Urethane Foam System is the novel esters of phosphonic acid of the present invention. The Urethane Foam System described above does include the weight of the blowing agent, catalyst, and surfactant.

The polyol phosphonate may be blended by means known to the art with the other components of the Urethane Foam System at temperatures ranging from 0 to about 150 degrees centigrade—although usually temperatures of 25–50 degrees centigrade are utilized.

In addition to the polyurethane the phosphonates of this invention may be utilized as flame-retarding additives or reactants in other plastic systems, such as the polyesters, polyacrylates, polymethacrylates, polyepoxides, polyvinylchlorides, phenylaldehyde polymers, polyamides, and so forth.

The following examples illustrate the invention, but do not limit it. All parts are by weight, moles are gram moles, and temperatures are in degrees centigrade unless otherwise stated.

EXAMPLE 1

Triphenyl phosphite (2 moles, 620 grams) was charged with oxypropylated pentaerythritol (6 moles, 2448 grams) and sodium hydride (.4 gram) into a reaction vessel. This mixture was heated to a temperature of 135 degrees centigrade and maintained at this temperature for two hours. Epichlorohydrin (46.4 grams) was then added to the reaction mixture as a catalyst and this reaction mixture heated for a period of 20 hours at about 175 degrees centigrade. The mixture was then maintained at this temperature until a negligible iodine titer (a titer of less than 1 percent of the original titer) was obtained. Excess phenol by-product was removed at ultimate condition of 160 degrees centigrade at from 10 to 15 millimeters mercury. After isolation of the phosphonate the product was neutralized with epichlorohydrin (246 grams, in 2,459 grams of phosphonate) for a period of two hours at 120 degrees centigrade. There was an increase in weight of 2 percent after this epichlorohydrin neutralization treatment.

The product was viscous and had a yellow, oily appearance when visually viewed. The following is the structural formula of the product:

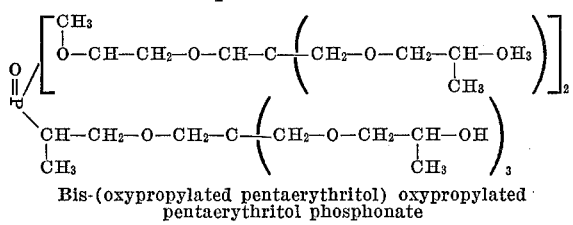

Bis-(oxypropylated pentaerythritol) oxypropylated pentaerythritol phosphonate

Infrared analysis of a sample of this product indicates that the above structure was obtained. The product had an acid number of less than 0.5, a hydroxyl number of 420, and a Gardner viscosity (Gardner seconds, at 50 degrees centigrade) of 12.

EXAMPLE 2

Tris(beta-chloroisopropyl) phosphite (5 moles, 4,558 grams) and trimethylol propane (15 moles, 2,012.15 grams) and sodium hydride (1.5 grams) were charged into a reaction flask and heated for four and one-half hours at 120 degrees centigrade. The reaction mixture was then heated to a temperature of 150 degrees centigrade and maintained at from about 150 to about 175 degrees centigrade for a period of eight and one-half hours. At the end of this time a negligible iodine titer was obtained and the volatile side products were vacuum stripped under similar conditions as Example 1. The product was a viscous liquid which had a yellowish appearance on visual examination. An 86 percent yield was obtained, based on tris(beta-chloroisopropyl) phosphite. It had the following structural formula

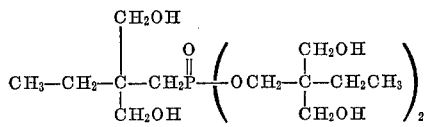

Bis-(trimethylol propane) trimethylol propane phosphonate

Infrared analysis of the sample indicated the above structural formula.

EXAMPLE 3

Tris(chloroethyl) phosphite (7 gram moles, 1,887 parts), trimethylol propane (21 gram moles, 2,818 parts), and 4.2 parts of sodium hydride were charged into a reaction vessel. This mixture was heated for a period of three and one-half hours at 120 degrees centigrade. The reaction mixture was then heated and maintained at a temperature of 150 to 175 degrees centigrade until a negligible iodine titer was obtained. It took eight and one-half hours for this to occur. The product obtained was a viscous liquid which had a yellow, oily appearance on visual examination. A sample was subjected to infrared analysis and this analysis indicated a structural formula similar to the structure of Example 2.

If the procedures of Examples 1 to 3 are followed products as indicated below will be obtained.

EXAMPLE 4

Reactants:

Triphenyl phosphite—1 gram mole
    Dipentaerythritol—3 gram moles
    Sodium hydride—0.1 gram
    Butyl bromide—.1 gram mole Product:

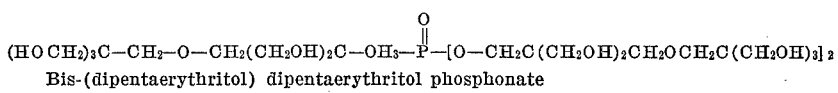

Bis-(dipentaerythritol) dipentaerythritol phosphonate

EXAMPLE 5

Reactants:

Triphenyl phosphite—1 gram mole
    Tripentaerythritol—3 gram moles
    Sodium hydride—0.1 gram
    Butyl bromide—0.1 gram mole Product:

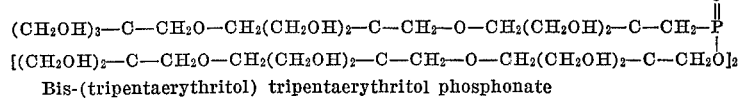

Bis-(tripentaerythritol) tripentaerythritol phosphonate

EXAMPLE 6

Reactants:

Triphenyl phosphite—1 mole
    n-Butanol—1 mole
    Pentaerythritol—2 moles
    Sodium hydride—0.1 gram
    Butyl bromide—1 mole Product:

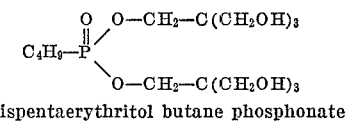

Bispentaerythritol butane phosphonate

EXAMPLE 7

Reactants:

Triphenyl phosphite—1 mole
    Allyl alcohol—1 mole
    Pentaerythritol—2 moles
    Sodium hydride—1 gram
    Allyl bromide—1 mole Product:

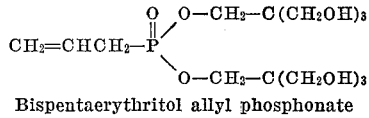

Bispentaerythritol allyl phosphonate

EXAMPLE 8

Reactants:

Dibutyl phenyl phosphite—1 mole
    Pentaerythritol—2 moles
    Butyl bromide catalyst—5 grams Product:

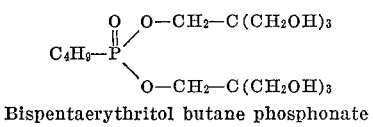

Bispentaerythritol butane phosphonate

EXAMPLE 9

Reactants:

Triethyl phosphite—1 mole
2,2,5,5-tetramethylol cyclopentanol-1—2 moles
Sodium hydride—1.0 gram
Ethyl chloride—5.0 grams Product:

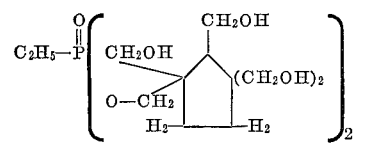

Bis (2,2,5,5-tetramethylol cyclopentanol-1) ethane phosphonate

EXAMPLE 10

Triphenylphosphite (6,200 grams, 20 moles), and trimethylol propane (5360 grams, 40 moles), and sodium hydride, 10 grams, were charged to a reaction vessel and heated for about one and one-half hours at about 138 degrees centigrade. Trichloro benzyl chloride (1 mole) was charged to 1 mole of the above reaction mixture which was then heated for two hours at about 180 degrees centigrade after which a negligible iodine titer was obtained. Volatile by-products (mostly phenol) were removed by distilling at about 130 degrees centigrade and eight (8) millimeters of mercury. The product had the following structural formula

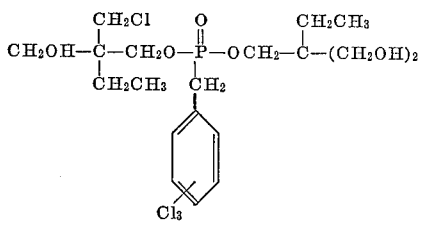

Bis-trimethylol propane trichlorobenzyl chloride phosphonate

The product had an hydroxyl number of 280, and a Gardner Viscosity (Gardner seconds at 50 degrees centigrade) of 11.

EXAMPLE 11

Triphenylphosphite (20 gram moles, 6,200 parts) and trimethylolpropane (40 gram moles, 5,368 parts), were charged to a reaction flask and heated for 1 hour and 30 minutes at a temperature of 138 degrees centigrade. At the end of this period of time about 1 mole of this mixture was removed from the reaction flask and heated to a temperature of from about 170 to about 200 degrees centigrade for a period of ten hours with 3,3-bischloromethyloxetane (1 mole). The volatile by-products formed were then removed from the reaction vessel by vacuum distillation at ultimate conditions of about 135 degrees centigrade pot temperature, at 5 milliliters of mercury absolute. The product had the following structure:

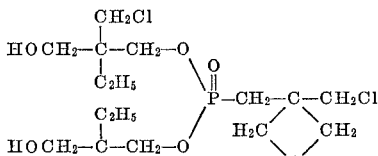

Bis (trimethylol propane)-3,3-bischloromethyl oxetane phosphonate

The product was submitted to infrared analysis and evidence obtained thereby indicated the presence of the above structure. It had a hydroxy number of 510 and a Gardner Viscosity (Gardner seconds at 50 degrees centigrade) of 60.

Following the procedure of Example 1 the following products will be obtainable:

EXAMPLE 12

| Reactants: | Moles |
|---|---|
| Ethyl diphenyl phosphite | 1 |
| Trimethylol propane | 2 |
| 3,3-bischloromethyl oxatane | .5 |

Product:

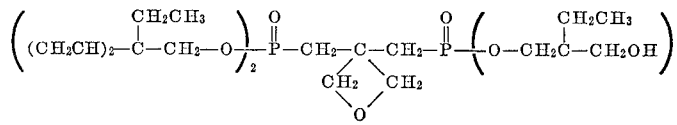

EXAMPLE 13

Reactants:

Triphenyl phosphite—1 mole
Trimethylol propane—2 moles
Sodium—1 gram
Allyl chloride—1 mole Product:

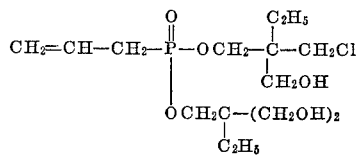

EXAMPLE 14

Reactants:

Triphenyl phosphite—1 mole
Trimethylol propane—2 moles
Sodium—1 gram
Methallyl chloride—1 mole Product:

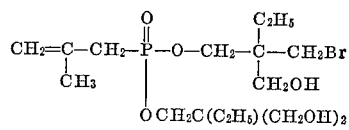

EXAMPLE 15

Reactants:

Triphenyl phosphite—1 mole
Trimethylol propane—2 moles
Sodium—1 gram
1,4-dibromobutene-2—0.5 mole Product:

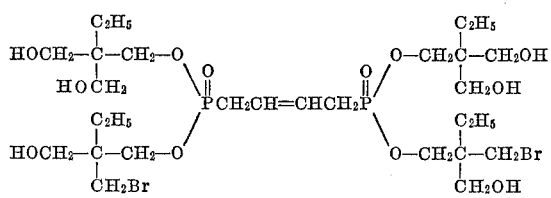

EXAMPLE 16

Reactants:
    Triphenyl phosphite—1 mole
    Trimethylol propane—2 moles
    Sodium—1 gram
    1,4-dichloromethyl benzene—0.5 mole Product:

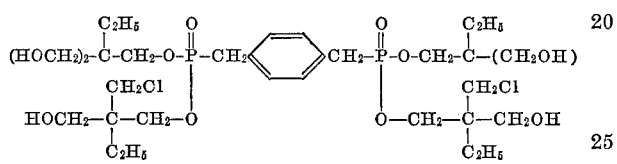

EXAMPLE 17

Reactants:
    Triphenyl phosphite—1 mole
    Dipentaerythritol—2 moles
    Sodium—1 gram
    2,5-bischloromethyl furane—.5 mole Product:

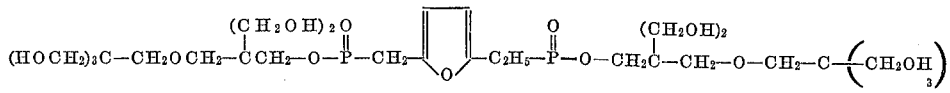

EXAMPLE 18

Reactants:
    Triphenyl phosphite—1 mole
    Dipentaerythritol—2 moles
    Sodium—1 gram
    Propargyl bromide—1 mole Product:

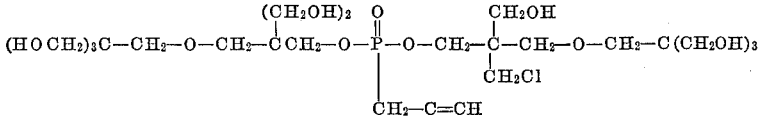

EXAMPLE 19

Reactants:
    Triphenyl phosphite—1 mole
    1,3-propanediol—1 mole
    Sodium—1 gram
    2,5-dinitro-2,5-bis hydroxymethyl 1,6-hexanediol—1 mole
    Bromocyclohexane—1 mole Product:

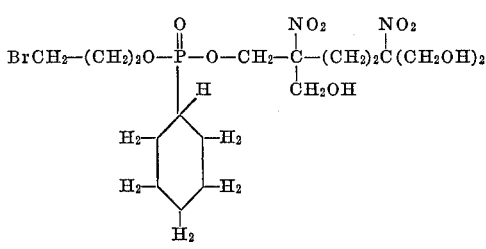

1,3-propanediol-2,5-dinitro-2,5-bis-hydroxymethyl-1,6-hexanediol bromocyclohexane phosphonate

EXAMPLE 20

Reactants:
    Triphenyl phosphite—1 mole
    1,3-propanediol—1 mole
    Sodium—1 gram
    Pentaerythritol—1 mole
    Bromocyclohexane—1 mole Product:

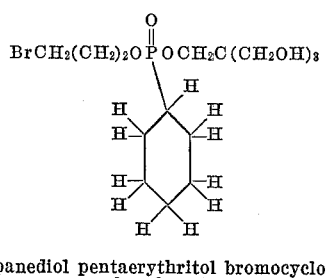

1,3-propanediol pentaerythritol bromocyclohexane phosphonate

EXAMPLE 21

Reactants:
    Triphenyl phosphite—1 mole
    1,3-propanediol—1 mole
    Sodium—1 gram
    1,1,1,3,3,3-hexamethylol-propanol-2—1 mole
    Bromocyclohexane—1 mole Product:

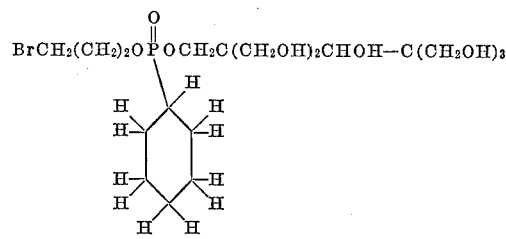

1,3-propanediol-1,1,1,3,3,3-hexamethylol propane-2-bromocyclohexane phosphonate

EXAMPLE 22

Reactants:
    Iso-amyl diphenyl phosphite—1 mole
    2-methylol-2-nitro-1,3-propanediol—2 moles
    Sodium—1 gram
    Iso-amyl bromide—.1 mole The structure of the resulting phosphonate is as indicated:

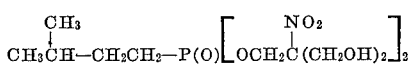

Bis-(2-methylol-2-nitro-1,3-propanediol isoamyl phosphonate

EXAMPLE 23

Reactants:
 Iso-amy diphenyl phosphite—1 mole
 Trimethylol isobutane—2 moles
 Sodium—1 gram
 Iso-amyl bromide—.1 mole Product:

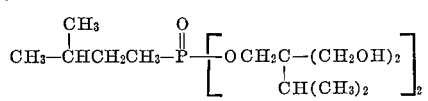

Bis-(trimethylol isobutane) isoamyl phosphonate

EXAMPLE 24

Reactants:
 Iso-amyl diphenyl phosphite—1 mole
 Pentaerythritol mono-methyl ether—2 moles
 Sodium—1 gram
 Iso-amyl bromide—.1 mole Product:

Bis-(pentaerythritol monoethyl ether) isoamyl phosphonate

EXAMPLE 25

Reactants:
 Iso-amyl diphenyl phosphite—1 mole
 Pentaerythritol—2 moles
 Sodium—1 gram
 Iso-amyl bromide—.1 mole The structure of the resulting phophonate is as indicated.

Product:

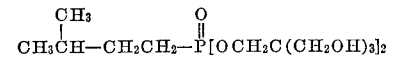

Bis-(pentaerythritol) isoamyl phosphonate

EXAMPLE 26

Reactants:
 Trichlorophenyl phosphite—1 mole
 Isobutanol—1 mole
 Oxypropylated novolak—2 moles
 Sodium hydride—1 gram
 Isobutyl bromide—.1 mole Product:

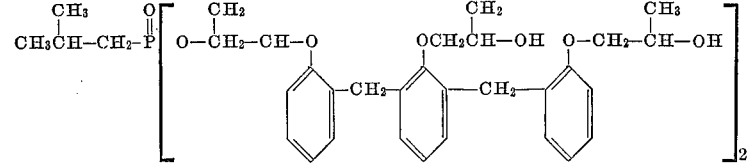

Bis-(oxypropylated-novolak) isobutyl phosphonate

EXAMPLE 27

The process of Example 26 is repeated substituting triphenyl or tricresyl phosphite for trichlorophenyl phosphite. The structure of the resulting phosphonate is as indicated in Example 26.

EXAMPLE 28

Triphenyl phosphite (2 moles, 620 grams), polyol 107-tris-(oxypropylated) pentaerythritol having a molecular weight of about 408 (6 moles, 2448 grams) were charged to a reaction vessel and heated at about 135 degrees centigrade for about 2 hours to effect transesterification. Epichlorohydrin (37 grams) was then added to the reaction mixture. This mixture was heated for twenty hours at about 175 degrees centigrade after which time a negligible iodine titer indicated a rearrangement had occurred.

Phenol was stripped as in Example 1 and a viscous material having a yellow appearance was recovered. Evidence obtained from infrared analysis indicated the structure of the product to be

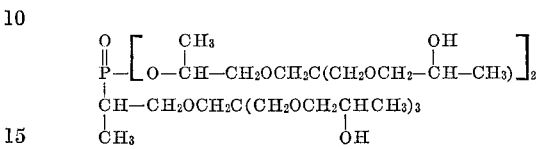

Phosphorus analysis:
 Percent phosphorus calculated—2.5
 Percent phosphorus actual—2.7

EXAMPLE 29

Triphenyl phosphite (3 moles, 930 grams), trimethylol propane (9 moles, 1208 grams) and sodium hydride (10 grams) were charged to a reaction vessel and heated to about 140 degrees centigrade over a period of the three hours. The reaction mixture was then thermally isomerized (rearranged) at a temperature of from about 185 to 210 degrees centrigrade to a negligible iodine titer. Rearrangement was deemed completed after a period of four hours. The volatiles were stripped at ultimate condition of about 185 degrees centigrade at a pressure of 1 millimeter of mercury absolute.

An approximately theoretical weight of the phosphonate was obtained, corresponding to the structure

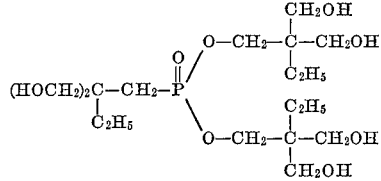

Bis (trimethylol propane) trimethylol propane phosphonate

The acidity of the phosphonate was reduced by mixing the product with 1,500 milliliters of epichlorohydrin and heating the reaction mixture for eight hours at about 120 degrees centigrade. The volatiles were then stripped at about 130 degrees centigrade under 3 millimeters of mercury absolute. The residue had the following properties when analyzed:

Hydroxyl number—562
Percent phosphorus—5.64
Viscosity (at 50 degrees centigrade)—76 Gardner seconds

EXAMPLE 30

Polyester

A polyester was prepared by the esterification of 10 moles (1,340 parts) of trimethylolpropane with 6 moles (877 parts) of adipic acid by known techniques. The resin thus formed had a hydroxyl number of about 500.

Mixture A.—To 70 parts of the polyester adipate system described above the following were added:

30 parts of the phosphonate of Example 29
28 parts of trichlorofluoromethane 0.5 part of a silicon surfactant such as silicon X–520
0.8 part of trimethylbutanediamine.

These ingredients were then mixed to obtain a homogeneous mixture.

Prepolymer

A prepolymer was prepared by the addition of 20 parts of the above described polyester to 80 parts of toluene diisocyanate (commercial mixture of 80% 2,4-toluenediisocyanate, and 20% 2,6-toluenediisocyanate). This mixture was then heated for two hours at a temperature from about 80 degrees to 100 degrees centigrade.

Preparation of foam

Mixture A (126 parts) was added to 1,293 parts of the prepolymer. This was mixed at a temperature of about 25 degrees centigrade for 30 seconds and then poured to yield a fine celled rigid urethane foam. The foam was then analyzed and had the following properties.

Density: 2.51 pounds per cubic foot
Compressive yield: 58.3 pounds per square inch The urethane foam described above showed improved fire resistance by the Underwriter's Laboratory Test–484 as compared to a similar foam compounded without the phosphonate of this invention.

EXAMPLE 31

The procedure set forth in Example 30 for the preparation of a polyurethane foam was repeated utilizing the novel phosphonate prepared in accordance with Example 12. A fine cell urethane foam was obtained having the following properties:

Density: 274 pounds per cubic foot
Compressive yield: 30.15 pounds per square inch Underwriters Laboratory Test–484 showed that it took 70.8 seconds per 1.89 inch to burn the material set forth therein, whereas, the control burned completely (6 inches) in 151.8 seconds.

Humidity aging test: 1.17 percent, change in weight after one week at 70 degrees centigrade at 100 percent relative humidity. It can be seen from Examples 31 and 33 that the novel phosphonates of the present invention may be utilized as fire retardants in urethane foams without minimum effect on physical properties.

EXAMPLE 32

Triphenyl phosphite (4 moles, 1,240 grams), trimethylol propane (8 moles, 1,072 grams) and sodium hydride (0.4 gram) were added to a reaction mixture and transesterified for about one hour at about 135 degrees centigrade. Epichlorohydrin (8 moles, 744 grams) was added dropwise to the reaction vessel while maintaining the temperature of the vessel at from about 120 to 135 degrees centigrade. The mixture was then heated at 120 degrees centigrade for about three hours. After this time an iodine titration indicated the presence of a negligible amount of phosphite. The reaction mixture was then stripped of volatiles by establishing an ultimate condition of a pot temperature of 130 degrees centigrade at 2.5 millimeters of mercury absolute.

Infrared analysis of the residue shows evidence of the structure

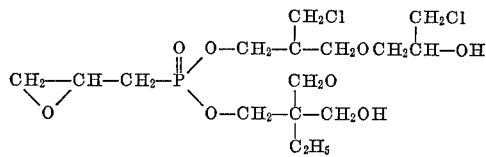

Bis (trimethylol propane) epichlorohydrin phosphonate

Phosphorus analysis of this product showed that it had a phosphorus content of 7.1 percent. The residue also had a hydroxyl number of 431.

EXAMPLE 33

The procedure followed in Example 30 was again utilized to prepare a polyurethane foam. However, in this instance 40 parts of phosphonate prepared in accordance with Example 32 and 60 parts of the polyester prepared and described in Example 30 were utilized to form the fine cell urethane foam. The urethane foam obtained had the properties shown in Table I which is a comparison between urethane foam prepared without the novel phosphonate of Example 32 contained therein and the urethane foam of this example:

TABLE I

| Properties | Control urethane foam | Urethane foam containing phosphonate |
|---|---|---|
| Density | [1] 1.89 | [2] 2.65 |
| Compressive yield, lbs. per sq. in | 41.26 | 61.27 |
| American Standard & Test Materials D0757–49, inches per minute | 9.43 | 1.30 |

[1] Cu. lbs. per cu. ft.
[2] Lbs. per cu. ft.

This example illustrates the utilization of the novel phosphonates of this invention as a flame retardant additive.

It can thus be seen from the examples set forth above that in preparing the polyurethane compositions of this invention, the hydroxyl-containing polymer, either alkyd resin or polyether, and polyisocyanate are preferably reacted in the ratio sufficient to provide about 85 to 115 percent of the isocyanate groups in respect to the total number of hydroxyls and carboxyl groups present in the hydroxyl-containing polymeric material, and the foaming agent, if one is provided. The reaction temperature generally ranges from about 20 to about 120 degrees centigrade, although higher and lower temperatures may be utilized depending on the composition.

The phosphonates of the present invention may be utilized in the range from about 0.2 to 100 percent of the polyol component contained in the urethane foam system; however, the preferred range being from about 5 to about 40 percent, with best results for the flame retardant being obtained when from 10 to 30 percent of the polyol component contained in the urethane foam system is the novel ester of phosphonic acid of the present invention. The urethane foam system described above does include the weight of the blowing agent, catalyst, and surfactant. The polyol phosphonate may be blended by means known to the art with the other components of the urethane foam system at temperatures ranging from 0 to about 150 degrees centigrade although usually temperatures of from 25 to 50 degrees centigrade are utilized. In addition to the polyurethane and phosphonates of this invention may be utilized as flame retarding additives or reactants in other plastic systems, such as polyester, polyacrylates, polymethacrylates, polyepoxides, polyvinyl chlorides, phenyl aldehyde polymers, polyamides and so forth.

EXAMPLE 34

Triphenyl phosphite (20 moles) and trimethylol propane (40 moles) were heated for one hour and 30 minutes at about 138 degrees centigrade in order to effect transesterification. After heating, about 1 mole of the reaction mixture was rearranged by heating at a temperature from about 190 degrees centigrade to about 200 degrees centigrade for a period of ten hours with polychloropentane ($C_5H_5Cl_7$), until a negligible iodine titer was obtained. The volatiles were removed from the reaction mixture by distilling at a temperature of 135 degrees centigrade at 6 millimeters of mercury absolute.

A material having the following structural formula was obtained.

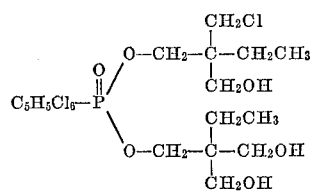

Bis (trimethylol propane) polychloropentane phosphonate

The residue was submitted for infrared analysis and the evidence obtained thereby substantiated this structure.

While the invention has been set forth in the above descriptions and examples, it should be realized that in its broadest aspects, the invention is not so limited. Many other modifications will become apparent to one skilled in the art upon a reading of this disclosure and these are also considered within the scope of this invention, as are equivalents which be substituted therein.

What we claim is:

1. The compound

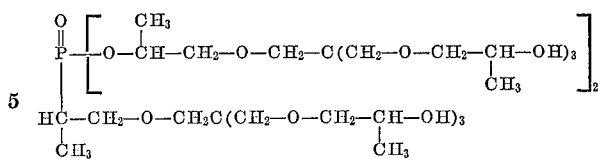

References Cited

UNITED STATES PATENTS 3,092,651   6/1963   Friedman _____ 260—953 XR

OTHER REFERENCES

Weston Chemical Corp., Newark, N.J., Product List WC-7, September 1961.

Weston Chemical Corporation, Newark, N.J., Product Lists WC-2, WC-6 and cover letter.

CHARLES B. PARKER, Primary Examiner

A. H. SUTTO, Assistant Examiner

U.S. Cl. X.R.

260—2.5, 30.6, 75, 333, 346.1, 348, 932, 937, 951, 954, 958, 967, 969, 982